US007250955B1

(12) United States Patent
Beeman et al.

(10) Patent No.: US 7,250,955 B1
(45) Date of Patent: Jul. 31, 2007

(54) SYSTEM FOR DISPLAYING A NOTIFICATION WINDOW FROM COMPLETELY TRANSPARENT TO INTERMEDIATE LEVEL OF OPACITY AS A FUNCTION OF TIME TO INDICATE AN EVENT HAS OCCURRED

(75) Inventors: Anthony Joseph Beeman, Seattle, WA (US); Paul Daley, Redmond, WA (US); Radu Bacioiu, Kirkland, WA (US); Christopher Cameron White, Seattle, WA (US); Chaitanya Dev Sareen, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 834 days.

(21) Appl. No.: 10/452,706

(22) Filed: Jun. 2, 2003

(51) Int. Cl.
G09G 5/02 (2006.01)
(52) U.S. Cl. ..................... 345/592; 345/629
(58) Field of Classification Search ............... 709/206, 709/219; 345/592, 629, 1.1, 710; 713/600, 713/300; 380/282; 705/35; 719/310; 715/530
See application file for complete search history.

(56) References Cited

U.S. PATENT DOCUMENTS

| 4,962,532 | A | 10/1990 | Kasiraj et al. ............... 380/25 |
|---|---|---|---|
| 6,260,148 | B1 | 7/2001 | Aggarwal et al. .......... 713/201 |
| 6,486,888 | B1 | 11/2002 | Fushiki et al. .............. 345/629 |
| 6,538,660 | B1 * | 3/2003 | Celi et al. ................... 345/592 |
| 6,549,218 | B1 | 4/2003 | Gershony et al. ........... 345/781 |
| 6,565,608 | B1 | 5/2003 | Fein et al. ................ 715/501.1 |
| 2002/0026487 | A1 * | 2/2002 | Ogilvie et al. .............. 709/206 |
| 2002/0044152 | A1 * | 4/2002 | Abbott et al. ............... 345/629 |
| 2003/0078865 | A1 * | 4/2003 | Lee ............................. 705/35 |
| 2003/0202663 | A1 * | 10/2003 | Hollis et al. ................ 380/282 |
| 2004/0061716 | A1 * | 4/2004 | Cheung et al. ............. 345/710 |
| 2004/0064530 | A1 * | 4/2004 | Sinclair et al. ............. 709/219 |
| 2004/0162880 | A1 * | 8/2004 | Arnone et al. .............. 709/206 |
| 2004/0168094 | A1 * | 8/2004 | Chen et al. ................. 713/300 |
| 2004/0181706 | A1 * | 9/2004 | Chen et al. ................. 713/600 |
| 2004/0194110 | A1 * | 9/2004 | McKee et al. .............. 719/310 |
| 2004/0237042 | A1 * | 11/2004 | Murray et al. .............. 715/530 |
| 2006/0007051 | A1 * | 1/2006 | Bear et al. ................... 345/1.1 |

OTHER PUBLICATIONS

Carroll, John M.; Neale, Dennis C.; Isenhour, Philip L.; Beth Rosson, Mary; Scott McCrickard, D., "Notification and Awareness: Synchronizing Task-Oriented Collaborative Activity," Center for Human-Computer Interaction Department of Computer Science Virginia Tech, *International Journal of Human Computer Studies*, vol. 58, No. 5, May, 2003, p. 605-632.

McCrickard, D. Scott; Catrambone, Richard; Stasko, John T.; Chewar, C.M., "Establishing Tradeoffs That Leverage Attention For Utility: Empirically Evaluating Information Display In Notification Systems," Department of Computer Science Virginia Polytechnic Institute Virginia State University, *International Journal of Human Computer Studies*, vol. 58, No. 5, May 2003, p. 547-582.

(Continued)

*Primary Examiner*—Le Hien Luu
(74) *Attorney, Agent, or Firm*—Merchant & Gould

(57) ABSTRACT

A method and apparatus for notifying a computer user of the occurrence of an event are provided. An indication is received that an event has occurred. In response to receiving the indication, a notification window is gradually displayed by varying the opacity of the window. When the event comprises the receipt of a new electronic mail message, the notification window includes a notification message indicating that the new electronic mail message has been received. If a predetermined period of time elapses without a selection of the new message notification window being received, the window is gradually removed. The new message notification window may be displayed above the displays provided by other executing applications.

32 Claims, 8 Drawing Sheets

OTHER PUBLICATIONS

McCrickard, D. Scott; Czerwinski, Mary; Bartram, Lyn, "Introduction: Design and Evaluation of Notification User Interfaces," *International Journal of Human Computer Studies*, vol. 58, No. 5, May 2003, p. 509-514.

Brush, A.J.B.; Bargeron, D.; Grudin, J.; Gupta, A., "Notification For Shared Annotation of Digital Documents," Conference Proceedings; Conference on Human Factors in Computing Systems, Apr. 2002, p. 89-96.

* cited by examiner

SYSTEM FOR DISPLAYING A NOTIFICATION WINDOW FROM COMPLETELY TRANSPARENT TO INTERMEDIATE LEVEL OF OPACITY AS A FUNCTION OF TIME TO INDICATE AN EVENT HAS OCCURRED

TECHNICAL FIELD

The invention generally relates to the field of event notification and, more specifically, to the field of notifying a computer user when an event has occurred.

BACKGROUND OF THE INVENTION

Many information workers spend a considerable portion of their workdays using personal computers. For many users, this means switching between several different application programs to perform different tasks as needed. For instance, many users utilize a word processor or spreadsheet as their primary application program. They may also use other application programs secondarily as needed. For many users, this means switching between a primary application program, such as a word processor, that is executing in the foreground, to a secondary application program, such as an electronic mail ("e-mail") client application, that is executing in the background.

The switch between a primary application program and an e-mail client application executing in the background is frequently performed when a sound is played by the e-mail client application indicating that a new e-mail message has been received. Users switch to the e-mail client application typically to see who the message is from and what the message concerns. It may be frustrating for a user to switch away from their primary application to the e-mail client application only to find that the new e-mail message is unimportant or even unsolicited e-mail (called "spam"). The user then must switch back to the primary application program and resume their work.

Not only is it frustrating for a user to switch between application programs only to discover that a new e-mail message is unimportant, it is also costly. In particular, although it may only take a few seconds to switch between applications, these few seconds may add up to a substantial amount of time if done many times during a workday. Moreover, it also takes a large amount of time for a user to regain mental focus on the work being performed in the primary application program following a switch to an e-mail client application program. This type of interruption to the concentration of a user can seriously affect productivity if done many times during a workday.

It is with respect to these considerations and others that the present invention has been made.

SUMMARY OF THE INVENTION

Embodiments of the invention address the above-described problems by providing methods, systems, and apparatus for providing notification messages indicating that certain types of events have occurred. According to one aspect of the invention, a notification message is provided that indicates to a user that a new e-mail message has been received. Through the notification window, a user can open, delete, flag, or mark an e-mail message as read. According to other embodiments, the notification window may be utilized to provide meeting requests which include the time and date of the meeting, or document updates that include information about a document or document library that has been modified.

The notification message is displayed gradually by varying the opacity of a notification window. Additionally, the notification window is displayed above other executing applications. If the notification window is selected by a user, the window is displayed with full opacity, thereby allowing the user to easily view the window. If the notification window is selected by a user, the notification window is gradually removed by decreasing the opacity of the window until the window disappears. By displaying the window above other applications and in a translucent manner, a user does not have to exit an application program they are working in to receive a notification that an event has occurred. The timing and transparency properties of the notification window may be altered by a user.

According to one aspect of the invention, a method is provided for providing a notification message indicating that a new e-mail message has been received. According to the method, an indication is received, such as from an e-mail server computer, that a new e-mail message has been received. In response to the indication, a new message notification window is gradually displayed. The new message notification window includes a notification message indicating that a new e-mail message has been received.

According to the method, a determination is made as to whether a pre-determined period of time has elapsed without a user selection of the new message notification window being received. If the new message notification window is not selected within a pre-determined period of time, the new message notification window is gradually removed from the display.

According to various embodiments of the invention, the new message notification window may be displayed in varying degrees of opacity. According to these methods, gradually displaying a new message notification window includes gradually increasing the opacity of the new message window. Similarly, gradually removing the new message notification window includes gradually decreasing the opacity of the new message window until the new message window disappears.

The new message notification window is also displayed over any currently executing application programs, thereby allowing a user to receive a notification of a new e-mail message without switching between application programs. However, the new message notification window is not displayed over certain applications executing in full screen mode. According to other embodiments of the invention, the new message notification window includes text identifying a sender of the new e-mail message and a preview of the new e-mail message. Moreover, the new message notification window includes a user interface object which, when selected, will cause the e-mail message to be made available for viewing through an e-mail client application. The new message notification window may also include a user interface object which, when selected, will cause the new e-mail message to be deleted, to be marked as read, or to be flagged for follow-up.

According to another aspect of the invention, a method is provided for notifying a computer user of the occurrence of an event that ensures that a large number of notification messages will not be displayed sequentially. According to this method, an indication is received that a new electronic mail message has been received, such as a notification from an e-mail server computer. In response to receiving such an indication, a request is generated to display a new message notification window. A determination is then made as to whether the request to display the new message notification window was generated by a rule created within an e-mail client application program. For instance, a rule may be created that causes a new message notification window to be displayed when an e-mail is received from a particular sender. If the new message notification window is generated by a rule, a determination is then made as to whether a new message notification window for a previous notification is still being displayed. If a new message notification window is not being displayed, the new message notification window generated by the rule is gradually displayed. The new message notification window is displayed above all other executing applications. If the new message notification window is not selected, it is gradually removed from the display screen. A user may also set the location of the new message notification window on the display screen. Future new message notification windows are displayed at the same location.

According to additional aspects of the method, if the request to display a new message notification window is not generated by a rule, a determination is made as to whether a predetermined number of new message notification windows have been queued for display. This may occur, for instance, when a large number of new e-mail messages are received simultaneously or within a short time period of one another. If a number of new message notification windows have been queued for display, a window is displayed that includes text indicating that multiple new messages have arrived. Moreover, no new message notification windows will be displayed until a predetermined period of time has elapsed since the receipt of the previous new e-mail message. Once the predetermined period of time has elapsed, the message queue may be reset.

The invention may also be implemented as a computer process, a computing system, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
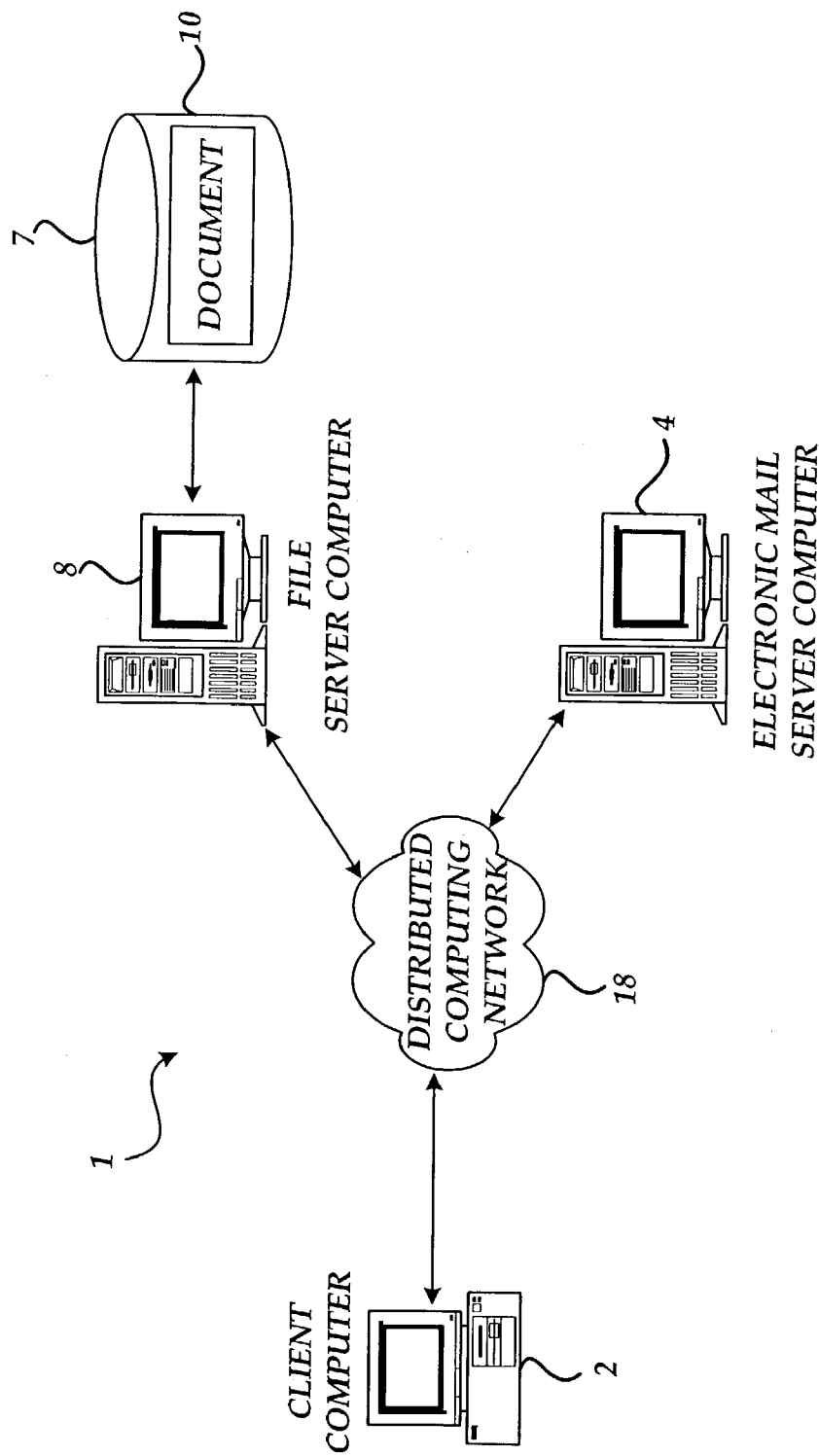
FIG. 1 is a network diagram illustrating a computer system used in the various embodiments of the invention.

Referring now to the drawings, in which like numerals represent like elements, a computer hardware and software architecture utilized by a computer system provided in the various embodiments of the invention will be described. In particular, FIGS. 1 and 2 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multi-processor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative system 1 for embodying various aspects of the present invention will be described. According to the various embodiments of the invention, the system 1 includes a client computer 2 capable of executing multiple application programs, such as a word processing application program and an e-mail client application program. The client computer 2 is connected to other computers through a distributed computing network 18. The distributed computing network 18 may comprise a wide area network ("WAN"), a local area network ("LAN"), or a public network such as the Internet. Through the distributed computing network 18, the client computer is operative to receive electronic mail from the e-mail server computer 4. As known to those skilled in the art, the e-mail server computer 4 is operative to receive e-mail from other computers and to provide the e-mail to its final destination. E-mail server computers are well known to those skilled in the art.

The client computer 2 may also utilize the distributed computing network 18 to communicate with other types of computers, such as the file server computer 8. The client computer 2 may utilize the file server computer 8 to retrieve and store documents, such as the document 10, on a database 7. In addition to providing file storage and retrieval capabilities, the file server computer 8 may also provide document management and collaboration services. For instance, the file server computer 8 may provide functions for collaborating on documents, including notifying users when a document has been modified. As will be described in greater detail below, the client computer 2 is operative to provide a notification to a user when a new electronic mail message has been received from the e-mail server computer 4.

Moreover, according to various embodiments of the invention, the client computer 2 is operative to provide a notification to a user when a notification is received from the file server computer 8 that a document, such as the document 10, has been modified by another user. It should be appreciated that other types of notifications may be provided to a user of the client computer 2 other than those described herein.

Figure 2:
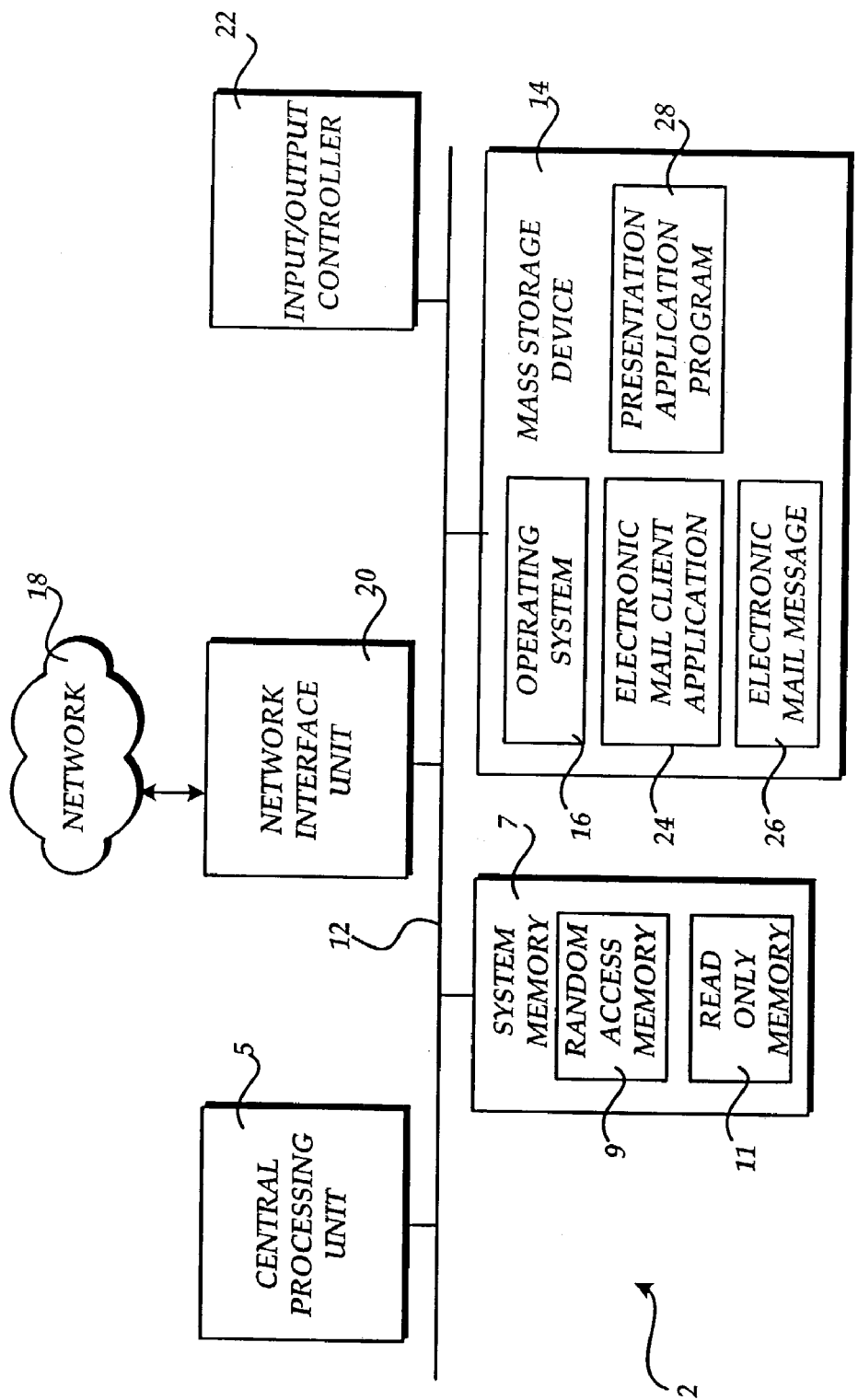
FIG. 2 is a computer architecture diagram illustrating various aspects of the hardware and software components utilized in a client computer in the various embodiments of the invention.

Turning now to FIG. 2, an illustrative computer architecture for a client computer 2 utilized in the various embodiments of the invention will be described. The computer architecture shown in FIG. 2 illustrates a conventional desktop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The client computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media, provide non-volatile storage for the client computer 2. Although the description of computer-readable media contained herein refers to a mass storage device, such as a hard disk or CD-ROM drive, it should be appreciated by those skilled in the art that computer-readable media can be any available media that can be accessed by the client computer 2 or the server computer 30, described below.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the client computer 2 or the server computer 30, described below.

According to various embodiments of the invention, the client computer 2 may operate in a networked environment using logical connections to remote computers, such as the e-mail server computer 4, through a network 18, such as the Internet. The client computer 2 may connect to the network 18 through a network interface unit 20 connected to the bus 12. It should be appreciated that the network interface unit 20 may also be utilized to connect to other types of networks and remote computer systems. The client computer 2 may also include an input/output controller 22 for receiving and processing input from a number of other devices, including a keyboard, mouse, or electronic stylus (not shown in FIG. 2). Similarly, an input/output controller 22 may provide output to one or more display screens, a printer, or other type of output device.

As mentioned briefly above, a number of program modules and data files may be stored in the mass storage device 14 and RAM 9 of the client computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store an e-mail client application 24. As known to those skilled in the art, an e-mail client application 24 is operative to provide functionality for sending and receiving electronic mail messages. As discussed briefly above, the e-mail client application 24 is operative to communicate with an e-mail server computer 4 to send and receive electronic mail messages, such as the e-mail message 26. One example of an e-mail client application 24 is the OUTLOOK e-mail-client application and personal organizer application program from MICROSOFT CORPORATION of Redmond, Wash. It should be appreciated that e-mail client application programs are well known to those skilled in the art and that various e-mail client application programs exist for execution on virtually all computing platforms.

As shown in FIG. 2, the mass storage device 14 may also store other types of application programs. For instance, the mass storage device 14 may store a presentation application program 28. As will be discussed in greater detail below, embodiments of the invention provide a notification message to a user of the client computer 2 when a new electronic mail message 26 has been received. According to one embodiment of the invention, prior to displaying the notification message, a determination is made as to whether an application program, such as the presentation application program 28, is executing in a full screen mode. This will be the mode used typically by a presenter when presenting to an audience.

If the presentation application program 28, or other application program, is executing in a full screen mode, the notification message will not be displayed above the display of the presentation application program 28. In this manner, the risk of displaying a notification message that includes sensitive or personal information while a presentation is being made is eliminated. Additional details regarding these features and others of the present invention will be described in greater detail below.

Figure 3A:
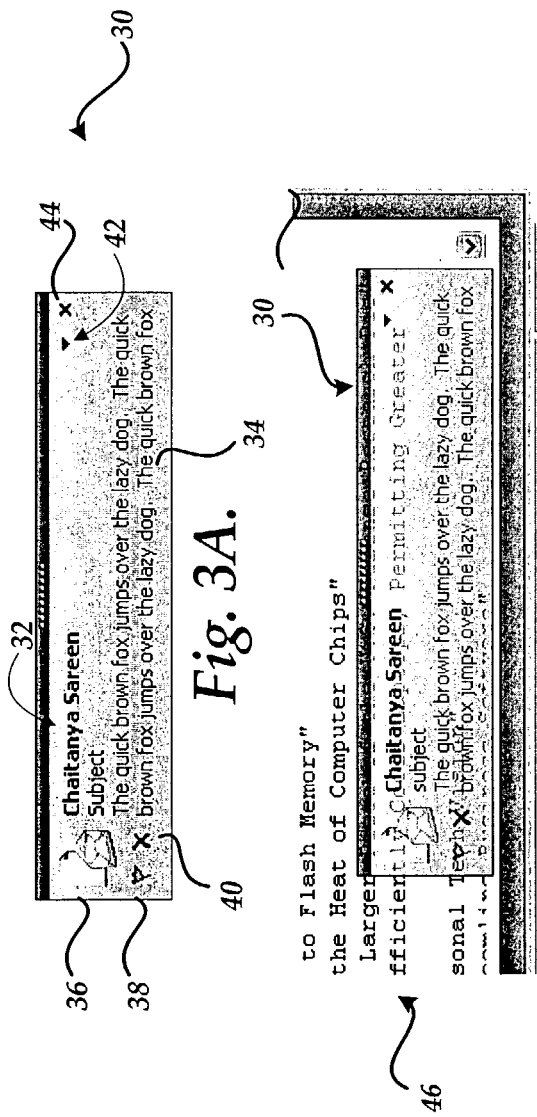
FIGS. 3A-3C are screen diagrams provided by an e-mail client application according to the various embodiments of the invention.

Turning now to FIG. 3A, a screen diagram illustrating various aspects of a new message notification window 30 provided by various embodiments of the invention will be described. As shown in FIG. 3A, the new message notification window 30 comprises a notification window indicating that a new e-mail message has been received. The new message notification window 30 includes text 32 that identifies the sender of the new e-mail message and text 34 that provides a portion of the new e-mail message, including the subject of the e-mail message. According to one embodiment of the invention, the text 34 comprises the first several lines of the new e-mail message. In other embodiments, a summary may be generated and placed within the new message notification window 30 as text 34. By quickly viewing the text 32 and the text 34, a user of the client computer 2 can quickly determine whether any action needs to be taken regarding the new e-mail message without switching between application programs.

According to various embodiments of the invention, the new message notification window 30 includes various on-object controls for performing functions related to the new e-mail message. For instance, according to one embodiment of the invention, the new message notification window 30 includes a button 40 for deleting the new e-mail message. In this manner, a user of the client computer 2 can delete the new e-mail message without having to switch to the e-mail client application program 24. Additionally, the new message notification window 30 may include a button 38 for flagging the new e-mail message for further follow-up. Similarly, the button 36 may be selected by a user on the new message notification window 30 for immediately switching to the e-mail client application 24 and opening the e-mail message 26 for viewing.

According to various embodiments of the invention, the new message notification window may also include a button 42 which, when selected, provides a pull-down menu with additional options. One of these options may provide the user with the capability to mark the new e-mail message as having been read. Other options may also be provided through the use of a pull-down menu displayed when the button 42 is selected. The new message notification window may be dismissed by selecting the button 44.

Figure 3B:

Referring now to FIG. 3B, additional details regarding process of displaying the new message notification window 30 will be described. As discussed briefly above, the new message notification window 30 is displayed when an indication is received from an e-mail server computer 4 that a new e-mail message 26 has been received. The new message notification window 30 is displayed above all other applications executing on the client computer 2. For instance, as shown in FIG. 3B, the screen display 46 is displayed by a word processing application program. However, when the new e-mail message referenced in the new message notification window 30 is received, the new message notification window 30 is displayed above the screen display provided by the word processing application program. One exception to the general rule that the new message notification window 30 is displayed above the application windows provided by other application programs is described in greater detail below.

When the new message notification window is displayed, it is displayed gradually by varying the opacity of the new message notification window 30 from completely transparent to an intermediate level of opacity. In this manner, a user can "see through" the new message notification window 30 to the display of other application programs below the new message notification window 30. If no selection is made of the new notification window 30 within a predetermined period of time, such as by selecting the window 30 with a mouse or keyboard command, the new message notification window 30 is gradually removed. The new message notification window is gradually removed by varying the opacity from an intermediate level to zero. In this manner, a user can be provided with information regarding the sender and contents of a new e-mail message without interrupting the user's workflow. If a user chooses to ignore the new notification window, the new notification window 30 will be dismissed as described above within a short period of time.

Alternatively, the user may select a new message notification window 30 by hovering a mouse cursor over the window 30 or through a sequence of keyboard commands. When a selection is made of the new message notification window 30, the window 30 is displayed completely opaque. In this manner, once a selection is made, the user can clearly read the contents of the new message notification window 30. Additionally, the on-object controls are made available for selection by a user. In this manner, the user can delete the new e-mail message, flag it for further follow-up, read it, or perform other functions, without switching to the e-mail client application program 24.

As discussed briefly above, one exception exists to the general rule that the new message notification window 30 is displayed above the display provided by all other applications executing on the client computer 2. This exception occurs wherein an application program is executing on the client computer 2 in a "full screen" mode. This mode is typically used by presentation programs, such as the presentation application program 28, when presenting a slide show or other material to an audience. In this case, the client computer 2 is operative to determine whether an application program is executing in a full screen mode. If an application is executing in a full screen mode, the new message notification window 30 is displayed under the display provided by the application executing in a full screen mode. In this manner, the sender and contents of a new e-mail message are not displayed at a potentially inappropriate time.

According to various other embodiments of the invention, the new message notification window 30 can be placed anywhere on the display screen of the client computer 2. Future new message notification windows 30 will be displayed in the same location that the new message notification window 30 has been placed. Additionally, the new message notification window 30 may be placed on any monitor supported by the client computer 2 by dragging the appropriate handle of the new message window 30. In this manner, a full screen presentation may be performed on an external display of a computer connected to, for instance, a projector, while the new message notification window 30 is displayed on another screen. In this manner, for instance, messages may be transmitted to the presenter of a presentation without having the new message notification window 30 displayed on the presentation screen. According to other embodiments of the invention, a queuing mechanism may also be provided for ensuring that multiple sequential new message notification windows 30 are not displayed in rapid succession. Displaying such message in rapid succession may be confusing to a user. Additional details regarding this queuing mechanism will be described in greater detail below with respect to FIGS. 6A and 6B.

Figure 3C:
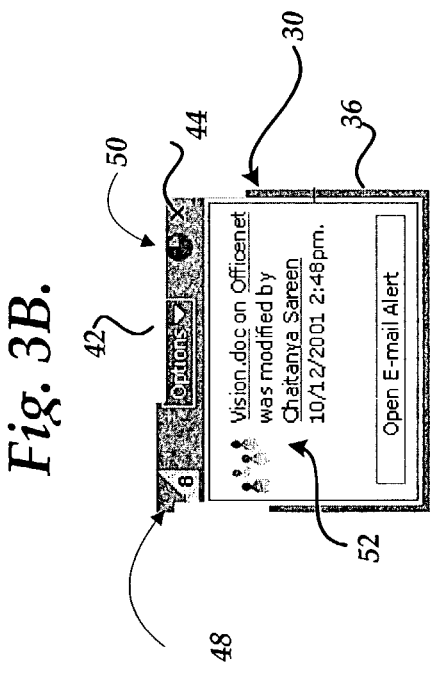

Referring to FIG. 3C, additional details regarding a new message notification window 30 according to one embodiment of the invention will be described. According to this embodiment of the invention, the new message notification window is generated in response to a notification from the file server computer 8 that a document 10 has been modified by a user. According to this embodiment of the invention, the new message notification window 30 includes text 52 indicating that a document has been modified on a server computer and identifying the user, time, and date of the modification. Additionally, the new message notification window 30 includes a button 36 that may be utilized to open the message. Moreover, the new message notification window 30 also includes a button 42 which, when selected, causes a number of options to be displayed on a menu. For instance, options may be made available for dismissing the message or performing other tasks. Also, a button 44 is made available for dismissing the new message notification window 30.

According to one embodiment of the invention, the new message notification window 30, includes an on-object control 48 that identifies a number of other notification windows that are currently waiting to be viewed. For instance, in the screen display shown in FIG. 3C, eight additional notification windows remain to be viewed. In this manner, multiple new message notification windows 30 may be "stacked" and made available for a user to view in the reverse order that they were received.

According to one embodiment of the invention, the new message notification window 30 also includes an on-object control 50 that indicates to a user the length of time before the new message notification 30 will be automatically dismissed. In particular, the on-object control 50 is configured like a timer that counts down in a clockwise fashion. When the timer reaches the 12:00 mark, the new message notification window 30 is automatically dismissed. In this manner, a user is provided with visual feedback regarding the amount of time they have to select the new message notification window 30 before it will be removed from the display screen. If a user "mouses-over" the control, the timer slows its countdown to provide feedback to the user that the notification window will only be retained for a short period of time.

Figure 4B:
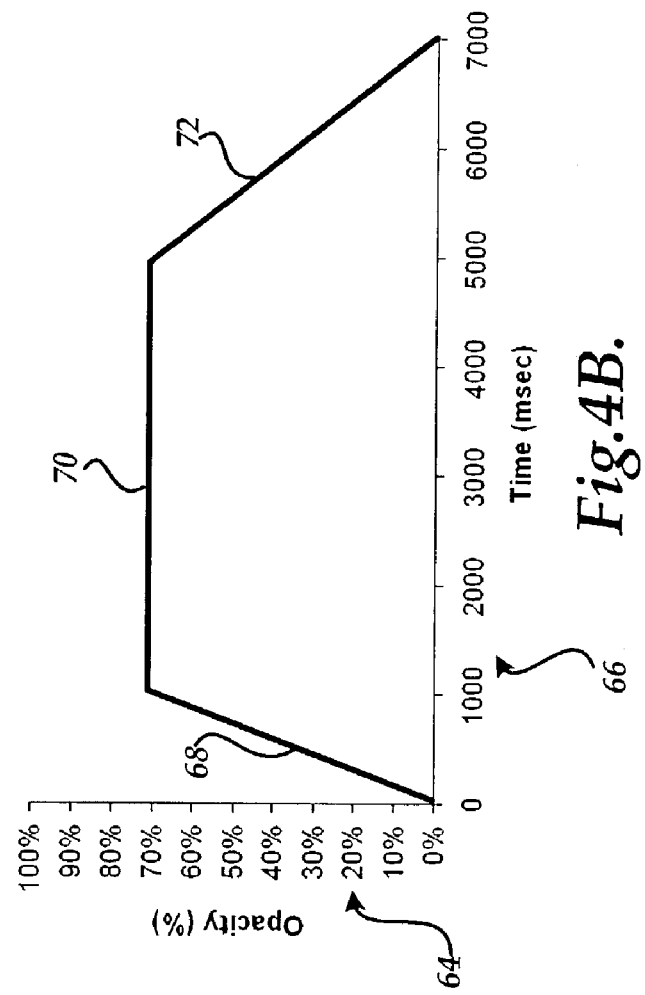
FIG. 4B is a line graph illustrating characteristics of the invention for displaying a user interface window with varying degrees of opacity.
Figure 4A:
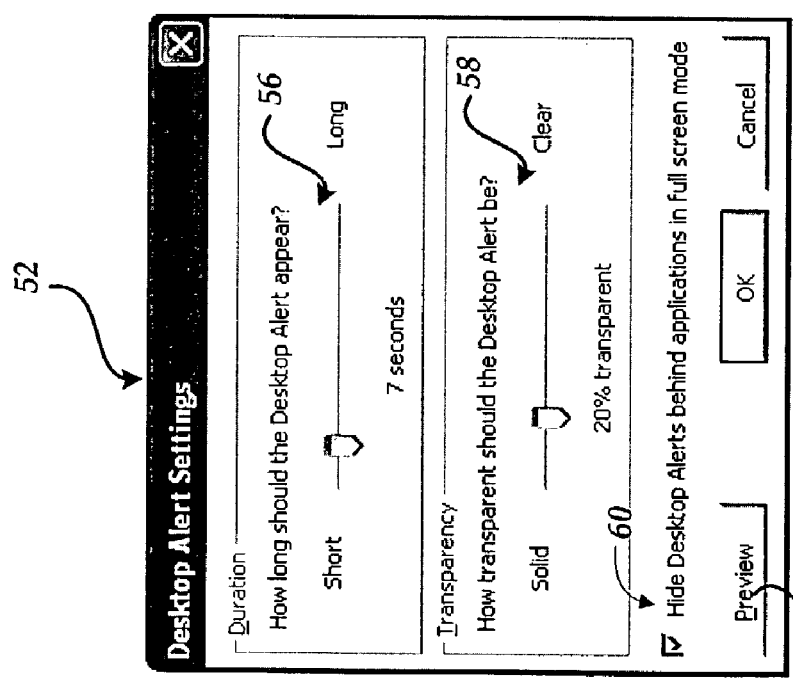
FIG. 4A is a screen diagram illustrating various aspects of the invention for customizing a screen display provided by an e-mail client application.

Referring now to FIG. 4A, an illustrative user interface window 52 will be described that allows users to define the characteristics and behavior of the new message notification window 30. In particular, the user interface window 52 includes a slider control 56 that allows the user to specify how long the new message notification window 30 should appear. Using the slider, the user may specify a length of time that the new message notification window 30 appears on the display screen.

The user interface window 52 also includes a slider control 58 that defines the transparency of the new message notification window 30 when the transparency reaches its intermediate state. The user may define transparency ranging from almost clear to a completely solid window. Additional details regarding this setting will be discussed below with respect to FIG. 4B.

According to one embodiment of the invention, the user interface window 52 also includes a checkbox 60 which, when checked, will cause new message notification windows 30 to be displayed behind applications operating in a full screen mode. As discussed above, this allows a user to ensure that new message notification windows will not be displayed over, for instance, presentation application programs operating in a full screen mode. In one embodiment, applications may suppress the display of notification windows while in full screen mode by creating a system-wide named object. A determination is made as to whether the object exists prior to displaying a notification window on top of the full screen display provided by an application program. If the object exists, the notification window will not be displayed in front of the full screen application. Additionally, according to one embodiment, the user interface window 52 also includes a button 62 which, when pressed, will provide a preview of the behavior of the new message notification window 30 according to the setting specified by a user.

Referring now to FIG. 4B, a graph will be described that illustrates the behavior of the new message notification window 30 according to the user settings in the user interface window 52 shown in FIG. 4A. In particular, the x-axis 66 of the graph identifies the time in milliseconds that the new message notification window will be displayed. According to the example in FIG. 4B, the new message notification window 30 is displayed for 7 seconds.

The y-axis of the graph shown in FIG. 4B indicates the opacity of the new message notification window 30. The rising portion of the graph 68 identifies the transition from a completely transparent window to the intermediate level set by the user using the slider 58. The intermediate level 70 is maintained for a period of time and then gradually decreased on the trailing end of the graph 72 until the opacity again reaches zero. According to one embodiment of the invention, the rising portion 68 is shorter than the trailing portion 72. By increasing the trailing portion, the user is provided more time to select the new message notification window 30 when the user realizes that the window is about to be removed.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as received within the claims attached hereto.

Figure 5A:
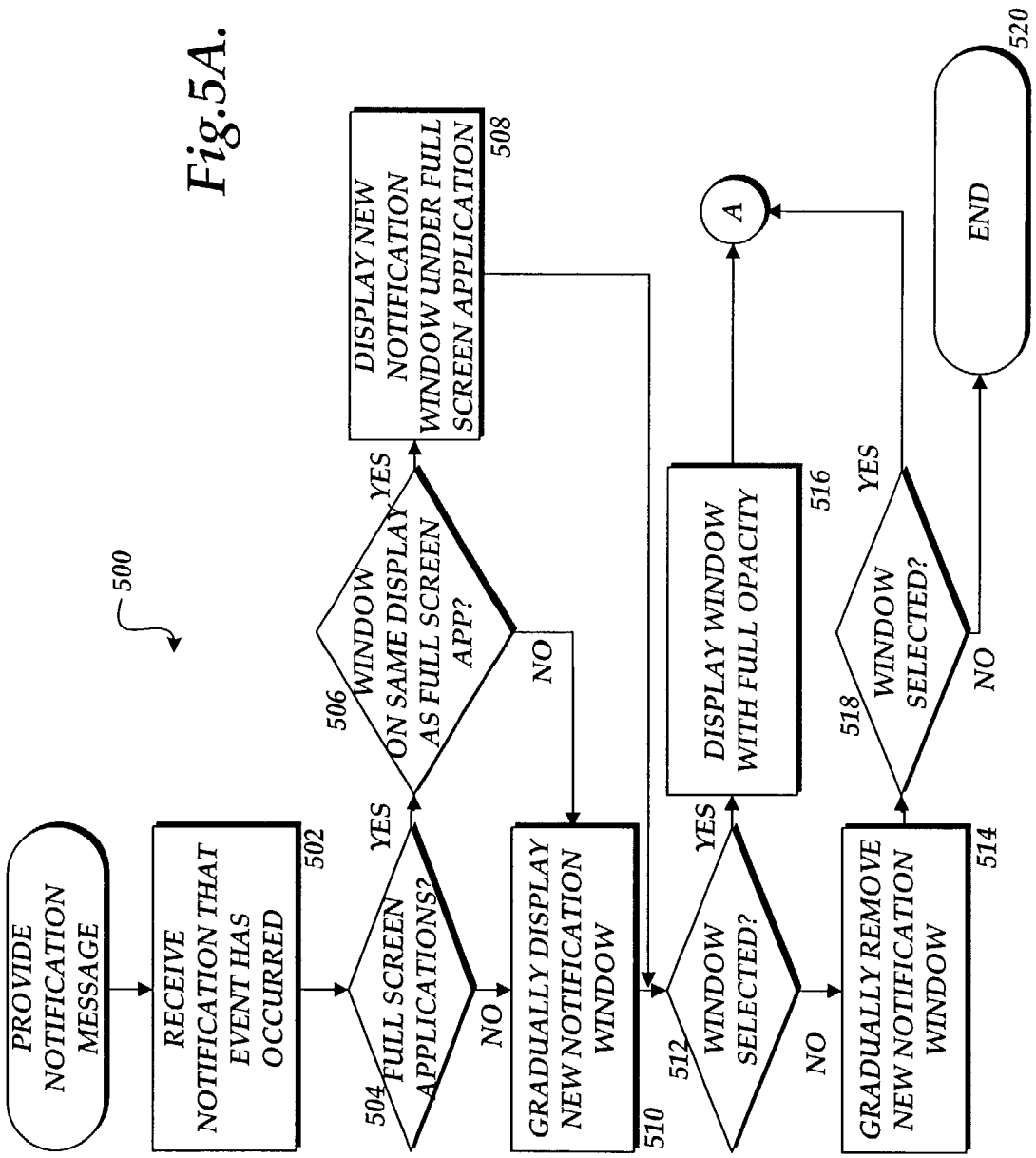
FIGS. 5A-6B are flow diagrams illustrating processes performed by an e-mail client application for providing a notification message that an event has occurred according to various embodiments of the invention.
Figure 5B:
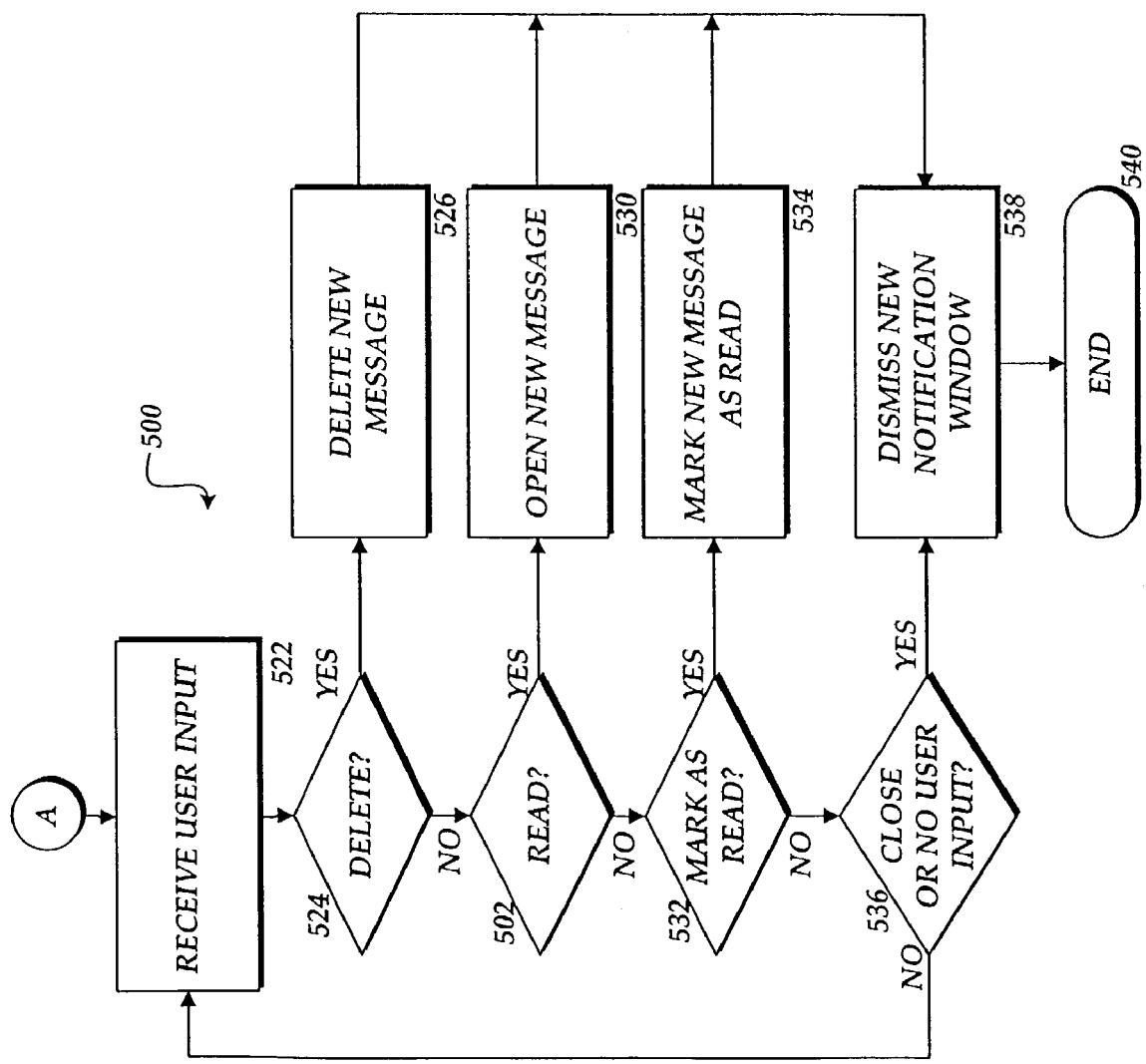

Turning now to FIGS. 5A-5B, an illustrative routine 500 will be described for providing a notification to a user that a new e-mail message has been received. The routine 500 begins at operation 502, where a notification is received that an event has occurred. As described briefly above, this notification may be a notification from an e-mail server computer 4 that a new e-mail message has been received, a notification from a file server computer 8 that a document 10 has been changed, or other type of notification. From operation 502, the routine 500 continues to decision operation 504.

At decision operation 504, a determination is made as to whether any full screen applications are executing on the client computer 2. By determining whether full screen applications are executing on the client computer 2, it can be ensured that new message notification windows 30 are not displayed over the top of these applications. If full screen applications are executing on the client computer 2, the routine 500 branches from decision operation 504 to decision operation 506.

At decision operation 506, a determination is made as to whether the new message notification window 30 is to be displayed on the same display as the application program operating in full screen mode. If the new message notification window 30 is not to be displayed on the same display screen as the application program operating in full screen mode, the routine 500 branches from decision operation 506 to operation 510. However, if the new message notification window 30 is to be displayed on the same display as the application program operating in full screen mode, the routine 500 branches from decision operation 506 to display operation 508.

At display operation 508, the new message notification window 30 is displayed under the display provided by the application program operating in full screen mode. In this manner, a new message notification window 30 will never be displayed over the top of an application program operating in full screen mode, such as the presentation application program 28.

From decision operations 504 and 506, the routine 500 continues to operation 510. At operation 510, the new message notification window 30 is gradually displayed by varying the opacity of the window from zero to the intermediate level specified in the user interface window 52. The routine 500 then continues to decision operation 512, where a determination is made as to whether the new message notification window 30 has been selected by a user. The selection by a user may comprise the act of hovering a mouse cursor over the window, selecting the window through a combination of keyboard commands, or performing other functions. If the new message notification window 30 has been selected, the routine 500 branches from decision operation 512 to display operation 516. At operation 516, the new message notification window 30 is displayed with full opacity for viewing by a user. The routine 500 then continues from display operation 516 to input operation 522.

If, at decision operation 512, it is determined that the new message notification window 30 has not been selected, the routine 500 continues to operation 514. At operation 514, the new message notification window 30 is gradually removed from the display screen after a predetermined period of time of nonselection by a user. The routine 500 then continues to decision operation 518 where a determination is made as to whether the new message notification window 30 has been selected by a user during the process of gradually removing the window 30. If the window has been selected by a user during removal, the routine 500 branches from decision operation 518 to input operation 522. However, if the new message notification window 30 is not selected by a user prior to the time that the opacity of the new message notification window reaches zero, the routine 500 branches from decision operation 518 to operation 520, where it ends.

At operation 522, input is received from the user. In particular, any of the on-object controls displayed on the new message notification window 30 may be selected and utilized by the user. Accordingly, from operation 522, the routine 500 continues to decision operation 524 where a determination is made as to whether a user has selected the on-object user interface for deleting the new e-mail message. If the user has selected the on-object control for deleting the message, the routine 500 branches from decision operation 524 to operation 526, where the new e-mail message is deleted. Deleting the new e-mail message may comprise sending a command to the e-mail client application 24 to delete the e-mail message. The routine 500 then continues from operation 526 to operation 538 where the new message notification window 30 is dismissed.

If, at decision operation 524, it is determined that the user has not selected the on-object control for deleting the new message, the routine 500 continues to decision operation 528. At decision operation 528, a determination is made as to whether the user has selected the on-object control for reading the new e-mail message. If the user has selected the on-object control for reading the message, the routine 500 branches from decision operation 528 to operation 530, where the new e-mail message is opened. This may comprise transmitting a request to the e-mail client application 24 to open the new e-mail message. The user is then free to view, edit, and otherwise interact with the new e-mail message 26. The routine 500 then continues from operation 530 to operation 538 where the new message notification window 30 is dismissed.

If, at decision operation 528, it is determined that the user has not selected the on-object control for reading the new e-mail message, the routine 500 continues from decision operation 528 to decision operation 532. At decision operation 532, a determination is made as to whether the user has selected the on-object control for marking the new e-mail message as read. If so, the routine 500 branches to operation 534, where a command is transmitted to the e-mail client application 24 to mark the new e-mail message as having been read. The routine 500 then continues to operation 538 where the new message notification window 30 is dismissed.

If, at decision operation 532, it is determined that the user has not selected the on-object control for marking the new e-mail message as read, the routine 500 continues to decision operation 536. At decision operation 536, a determination is made as to whether the user has selected the on-object control for closing the new message notification window 30 or has provided no input for a predetermined period of time. If the user has not requested to close the new message notification window 30 and has provided user input, the routine 500 branches from decision operation 536 back to input operation 522. If, however, the user has requested that the new message notification window 30 be closed or has provided no input for a predetermined period of time, the routine 500 branches from decision operation 536 to operation 538, where the new message notification 30 is dismissed. The routine 500 then continues from operation 538 to operation 540, where it ends.

Figure 6A:
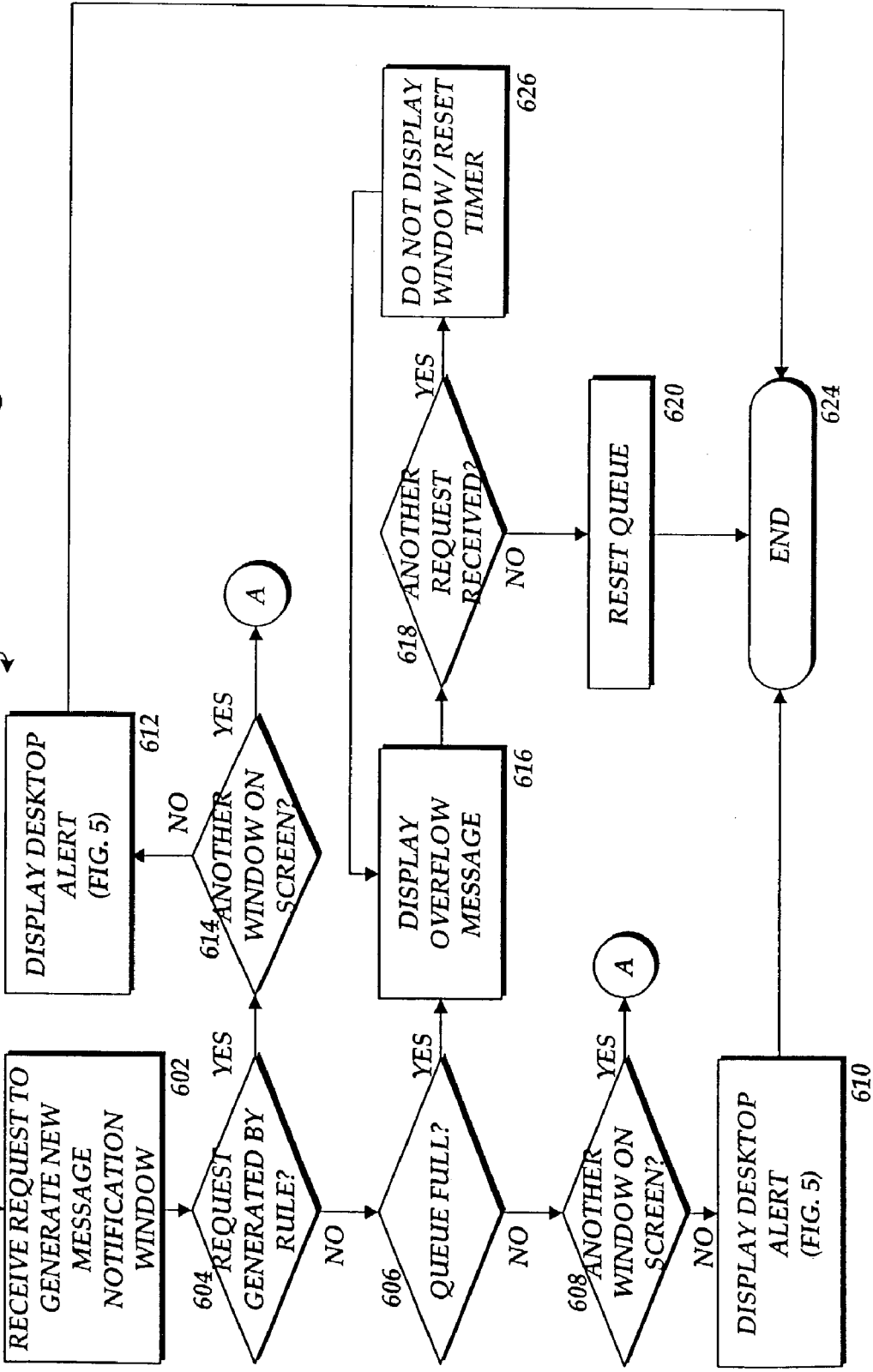
Figure 6B:
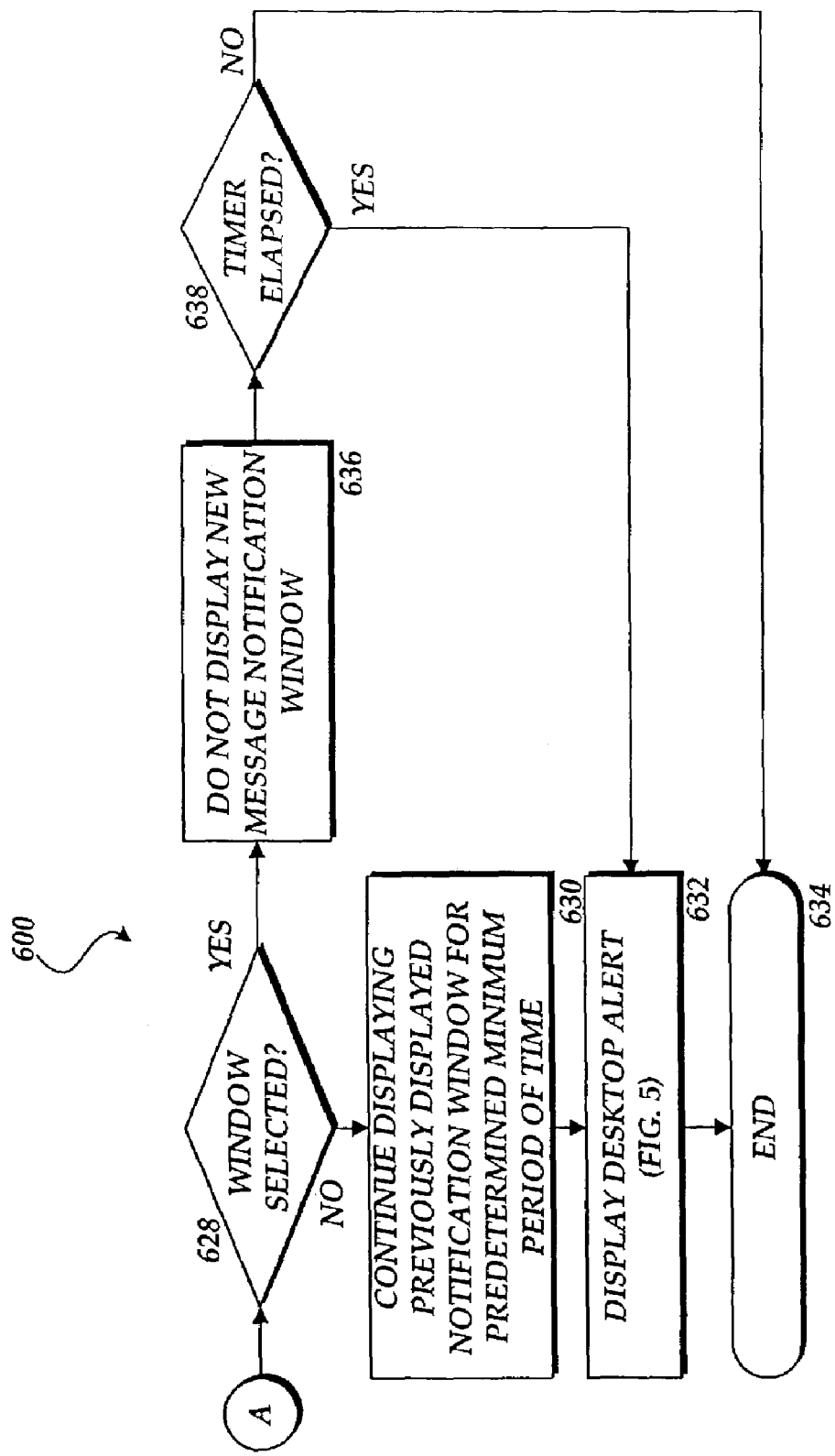

Referring now to FIGS. 6A and 6B, another method for providing a notification to a user that an event, such as the receipt of a new e-mail message, has occurred will be described. According to the method shown in FIGS. 6A and 6B, new message notification windows 30 may be generated in response to rules created within the e-mail client application program 24. As known to those skilled in the art, rules may be created that cause events to take place in response to certain conditions being met within the e-mail client application 24. For instance, a rule may be created that causes e-mail received from a particular recipient to be automatically forwarded, stored, deleted, or other actions to be taken.

According to one embodiment of the invention, the e-mail client application 24 is operative to provide functionality for causing new message notification windows 30 to be displayed in response to the satisfaction of certain rule conditions. Moreover, the method described below with respect to FIGS. 6A and 6B includes functionality for queuing the display of new message notification windows 30 in order to prevent a large number of new message notification windows 30 from being displayed in rapid succession. This may occur, for instance, when a large number of e-mails are received simultaneously or within a few seconds of one another. In this case, a message is displayed to the user indicating that new messages have been received, rather than displaying each of the new message notification windows 30 in rapid succession. Additional details regarding these aspects of the method according to this embodiment of the invention will be described in greater detail below.

The routine 600 begins at operation 602, where a request is received to generate a new message notification window 30. From operation 602, the routine 600 continues to decision operation 604, where a determination is made as to whether the request to generate the new message notification window 30 was generated by a rule executing on the e-mail client application program 24. If the request was generated by a rule, the routine 600 branches to decision operation 614, where a determination is made as to whether a previously displayed new message notification window is still being displayed on the display screen of the client computer 2. If no other new message notification windows 30 are being displayed, the routine branches from decision operation 614 to display operation 612. At display operation 612, the new message notification window is gradually displayed on the display screen and gradually removed as described above with respect to FIG. 5. The routine 600 then continues from display operation 612 to operation 624, where it ends.

If, at decision operation 614, a determination is made that a previously displayed new message notification window is still being displayed on the display screen of the client computer 2, the routine 600 branches from decision operation 614 to decision operation 628. At decision operation 628, a determination is made as to whether the previously displayed new message notification window 30 has been selected by a user, either by hovering the mouse cursor over the new message notification window 30 or by selecting the window 30 with keyboard commands. If the new message notification window 30 previously displayed has been selected by a user, the routine 600 branches from decision operation 628 to operation 636.

At operation 636, the new message notification window 30 is not displayed on the display screen of the client computer 2. In this manner, new message notification windows 30 will not be displayed when a user has selected a previously displayed new message notification window. However, if the user has selected a previously displayed new message notification window, but has not made any input for a predetermined period of time, the new message notification window 30 may be displayed. Accordingly, at decision operation 638, a determination is made as to whether the user has performed any operation on a previously displayed notification window 30 within a predetermined period of time. If a user has not made any input to the previously displayed new message notification window 30, the routine 600 branches from decision operation 638 to operation 632, where the new message notification window 30 is displayed as described above with respect to FIG. 5. If the user has made input into a previously displayed new message notification window 30, however, the routine 600 branches from decision operation 638 to operation 634, where it ends.

If, at decision operation 628, a determination is made that the previously displayed new message notification window 30 has not been selected by a user, the routine 600 branches from decision operation 628 to operation 630. At operation 630, the previously displayed new message notification window 30 is displayed for a predetermined period of time. In this manner, the previously displayed new message notification window is not immediately removed from the display screen. A user is provided a minimum period of time to select the previously displayed new message notification window 30 prior to the display of a new message notification window 30. From operation 630, the routine 600 continues to operation 632, where the new message notification window 30 is displayed. The process for displaying the new message notification window 30 is described above with respect to FIG. 5. From block 632, the routine 600 continues to operation 634, where it ends.

If, at decision operation 604, it is determined that the request to generate a new message notification window 30 was not generated by a rule, the routine 600 continues from decision operation 604 to decision operation 606. At decision operation 606, a determination is made as to whether a predetermined number of new message notification windows 30 have already been placed within a queue for display. For instance, if a large number of new e-mail messages are received in rapid succession, the new message notification windows 30 for each of the new e-mail messages would not be displayed simultaneously. Rather, the messages would be queued and displayed sequentially. However, if a predetermined number of messages remain to be displayed, the routine 600 would branch from decision operations 606 to operation 616. At operation 616, a message would be displayed to the user indicating that multiple new e-mail messages have arrived. The individual new message notification windows 30 for each of the new e-mail messages would not be displayed.

From operation 616, the routine 600 continues to decision operation 618, where a determination is made as to whether another request to generate a new message notification window 30 is received within a predetermined period of time. This would occur, for instance, when another new e-mail message was received in rapid succession. If another request to generate a new message notification window 30 is received within the predetermined period of time, the routine 600 branches to operation 626, where no new message notification windows are displayed. Additionally, the timer specifying the predetermined period of time within which another request is received is reset. From operation 626, the routine 600 branches back to operation 616.

If, at decision operation 618, it is determined that another request to generate a new message notification window 30 has not been received within a predetermined period of time, the routine 600 branches to operation 620 where the new message queue is reset. The routine 600 then continues to operation 624, where it ends.

If, at operation 606, it is determined that the new message notification window queue is not full, the routine 600 branches to decision operation 608. At decision operation 608, a determination is made as to whether a previously displayed new message notification window 30 is still being shown on the display screen of the client computer 2. If another previously displayed new message notification window 30 is being displayed on the display of the client computer 2, the routine 600 branches from decision operation 608 to decision operation 628, described above. However, if another previously displayed new message notification window 30 is not currently being displayed on the display screen of the client computer 2, the routine 600 branches to block 610, where the new message notification window 30 is displayed in the manner described above with respect to FIG. 5. The routine 600 then continues from operation 610 to operation 624, where it ends.

Based on the foregoing, it should be appreciated that the various embodiments of the invention provide a method, system, apparatus, computer-readable medium for notifying a user of the occurrence of an event, such as the receipt of a new e-mail message. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for providing a notification message indicating that an event has occurred, the method comprising:
   receiving an indication that the event has occurred;
   in response to receiving the indication, gradually displaying a notification window, the notification window comprising a notification message indicating that the event has occurred wherein gradually displaying the notification window comprises increasing an opacity of the notification window as a function of time from a zero opacity level at a first time to an intermediate opacity level at a second time;
   determining if a predetermined period of time has elapsed without a selection of the notification window being received; and
   in response to determining that the predetermined period of time has elapsed without a selection of the notification window, gradually removing the notification window wherein gradually removing the notification window comprises decreasing the opacity of the notification window as a function of time from the intermediate opacity level at a third time to the zero opacity level at a fourth time.

2. The method of claim 1, wherein the notification window is displayed in varying degrees of opacity.

3. The method of claim 2, wherein gradually displaying a notification window further comprises displaying the notification window over a currently executing application program.

4. The method of claim 3, further comprising:
determining whether a selection of the notification window has been made; and
in response to determining that a selection of the notification window has been made, displaying the notification window with full opacity.

5. The method of claim 4, wherein the event comprises the receipt of a new electronic mail message and wherein the notification window further comprises text including a portion of the new electronic mail message.

6. The method of claim 5, wherein the notification window further comprises a user interface object which, when selected, will cause the new electronic mail message to be deleted.

7. The method of claim 6, wherein the notification window further comprises text identifying a sender of the new electronic mail message.

8. The method of claim 7, wherein the notification window further comprises a user interface object which, when selected, will cause the new electronic mail message to be opened.

9. The method of claim 8, wherein the notification window further comprises a user interface object which, when selected, will cause the new electronic mail message to be marked as read.

10. The method of claim 9, wherein the notification window further comprises a user interface object which, when selected, will close the notification window.

11. The method of claim 2, further comprising determining if a currently executing application program is executing in a full screen mode, and wherein displaying a notification window further comprises displaying the notification window under the currently executing application program in response to determining that the currently executing application program is executing in a full screen mode.

12. The method of claim 1, wherein gradually removing the notification window comprises gradually removing the notification window wherein a time difference between the third time and the fourth time is greater that a time difference between the first time and the second time.

13. A computer-readable medium having stored thereon computer-readable instructions which, when executed by a computer, cause the computer to perform the method of claim 1.

14. A computer-controlled apparatus capable of performing the method of claim 1.

15. A method for providing a notification message indicating that a new electronic mail message has been received, the method comprising:
receiving an indication that a new electronic mail message has been received;
in response to receiving the indication, generating a request to display a new message notification window, the new message notification window comprising a notification message indicating that a new electronic mail message has been received;
determining whether the request to display a new message notification window was generated by a rule;
in response to determining that the request to display a new message notification window was generated by a rule, determining whether a previously displayed new message notification window is displayed; and
in response to determining that a previously displayed new message notification is not displayed, gradually displaying the new message notification window wherein gradually displaying the new message notification window comprises increasing an opacity of the new message notification window as a function of time from a zero opacity level at a first time to an intermediate opacity level at a second time, the intermediate opacity level being user defined.

16. The method of claim 15, further comprising:
in response to determining that a previously displayed new message notification is displayed, determining whether the previously displayed new message notification window is selected; and
in response to determining that the previously displayed new message notification window is not selected, displaying the previously displayed new message notification window for a predetermined minimum period of time, removing the previously displayed new message notification window, and gradually displaying the new message notification window.

17. The method of claim 16, further comprising:
in response to determining that the request to display a new message notification window was not generated by a rule, determining whether a predetermined number of new message notification windows have been queued for display;
in response to determining that a predetermined number of new message notification windows have been queued for display in a message queue, displaying a window comprising text indicating that multiple new messages have arrived and determining whether a predetermined period of time has elapsed since the receipt of the previous request to display a new message notification window; and
resetting the message queue in response to determining that a predetermined period of time has elapsed since the receipt of the previous request to display a new message notification window.

18. The method of claim 17, further comprising:
in response to determining that a predetermined number of new message notification windows have not been queued for display, determining whether a previously displayed new message notification window is displayed; and
in response to determining that a previously displayed new message notification is not displayed, gradually displaying the new message notification window.

19. The method of claim 18, further comprising:
in response to determining that a previously displayed new message notification is displayed, determining whether the previously displayed new message notification window is selected; and
in response to determining that the previously displayed new message notification window is not selected, displaying the previously displayed new message notification window for a predetermined minimum period of time, removing the previously displayed new message notification windows, and gradually displaying the new message notification window.

20. The method of claim 19, wherein the new message notification window may be displayed in varying degrees of opacity.

21. The method of claim 20, wherein gradually displaying a new message notification window further comprises displaying the new message notification window over a currently executing application program.

22. The method of claim 21, further comprising determining if a currently executing application program is executing in a full screen mode, and wherein displaying a new message notification window further comprises displaying the new message notification window under the currently executing application program in response to determining that the currently executing application program is executing in a full screen mode.

23. The method of claim 22, further comprising:
following the display of the new message notification window, determining whether a selection of the new message notification window has been made; and
in response to determining that a selection of the new message notification window has been made, displaying the new message notification window with full opacity.

24. The method of claim 23, wherein gradually removing the new message window comprises gradually decreasing the opacity of the new message window.

25. The method of claim 24, wherein the new message notification window further comprises text including a portion of the new electronic mail message.

26. The method of claim 25, wherein the new message notification window further comprises a user interface object which, when selected, will cause the new electronic mail message to be deleted.

27. The method of claim 26, wherein the new message notification window further comprises text identifying a sender of the new electronic mail message.

28. The method of claim 27, wherein the new message notification window further comprises a user interface object which, when selected, will cause the new electronic mail message to be opened.

29. The method of claim 28, wherein the new message notification window further comprises a user interface object which, when selected, will cause the new electronic mail message to be marked as read.

30. The method of claim 29, wherein the new message notification window further comprises a user interface object which, when selected, will close the new message notification window.

31. A computer-readable medium having stored thereon computer-readable instructions which, when executed by a computer, cause the computer to perform the method of claim 15.

32. A computer-controlled apparatus capable of performing the method of claim 15.

* * * * *